United States Patent [19]

Vermeulen et al.

[11] Patent Number: 5,519,784
[45] Date of Patent: May 21, 1996

[54] APPARATUS FOR CLASSIFYING MOVEMENT OF OBJECTS ALONG A PASSAGE BY TYPE AND DIRECTION EMPLOYING TIME DOMAIN PATTERNS

[76] Inventors: Pieter J. E. Vermeulen, 1164 Thorn Street, Hatfield, Pretoria Transvaal Province; Paul-Boer Putter, 70 Douglas Street, Colbyn, Pretoria Transvaal Province; Ben T. Zaaiman, 206 Chateau Lynn, 38 Farmer's Folly Drive, Lynnwood, Pretoria, Transvaal Province, all of South Africa

[21] Appl. No.: 441,783

[22] Filed: May 16, 1995

Related U.S. Application Data

[63] Continuation of Ser. No. 133,670, Oct. 7, 1993, abandoned.

[30] Foreign Application Priority Data

Oct. 7, 1992 [ZA] South Africa ............................ 92/7714

[51] Int. Cl.[6] ...................................................... G06K 9/06
[52] U.S. Cl. .................................................... 382/100
[58] Field of Search .................................... 382/100, 141, 382/181, 192, 276, 282, 271; 348/152–155

[56] References Cited

U.S. PATENT DOCUMENTS

| | | | |
|---|---|---|---|
| 3,727,034 | 4/1973 | Pope | 235/92 LG |
| 3,794,983 | 2/1974 | Sahin | 382/41 |
| 3,852,735 | 12/1974 | Matsuda et al. | 348/153 |
| 4,000,400 | 12/1976 | Elder | 235/92 CT |
| 4,112,463 | 9/1978 | Kamin | 348/154 |
| 4,127,766 | 11/1978 | Thayer | 235/92 PK |
| 4,148,062 | 4/1979 | Kamin | 348/154 |
| 4,799,243 | 1/1989 | Zepke | 347/6 |
| 4,831,259 | 5/1989 | Meixner et al. | 250/353 |
| 4,847,485 | 7/1989 | Koelsch | 250/221 |
| 4,874,063 | 10/1989 | Taylor | 187/120 |
| 4,912,748 | 3/1990 | Horii et al. | 250/221 |
| 4,914,298 | 4/1990 | Quad et al. | 250/349 |
| 4,993,049 | 2/1991 | Cupps | 377/6 |
| 5,020,114 | 5/1991 | Fujioka et al. | 382/1 |
| 5,055,685 | 10/1991 | Sugimoto et al. | 250/342 |
| 5,059,796 | 10/1991 | Nakamura | 382/1 |
| 5,068,537 | 11/1991 | Ishikawa et al. | 250/342 |
| 5,111,291 | 5/1992 | Erickson et al. | 348/152 |
| 5,243,418 | 9/1993 | Kuno et al. | 382/1 |

FOREIGN PATENT DOCUMENTS

| | | | |
|---|---|---|---|
| 0118182 | 9/1984 | European Pat. Off. | G06K 9/62 |
| 0380400 | 8/1990 | European Pat. Off. | G07C 9/00 |
| 0482427 | 4/1992 | European Pat. Off. | G06K 9/66 |
| 0559357 | 9/1993 | European Pat. Off. | G08B 13/183 |
| 2419549 | 10/1979 | France | G06M 1/00 |
| 2245401 | 1/1992 | United Kingdom | G06F 15/18 |
| 8800745 | 1/1988 | WIPO | G08B 13/18 |
| 9102323 | 2/1991 | WIPO | G06F 15/80 |

OTHER PUBLICATIONS

PCT Intern. Search Report PCT/EP93/02771 Feb. 11, 1994.

*Primary Examiner*—Jose L. Couso
*Attorney, Agent, or Firm*—William Squire

[57] ABSTRACT

An array of spaced parallel linear radiation beams are projected across a passage in sequentially spaced regions. Detectors sense when the beams are interrupted by one or more persons moving in the passage in either of two opposite directions. The beams are interrupted at different times in a sequence corresponding to the number of and direction of movement of persons. The sequentially generated interrupted beam signals are stored as object movement historic information in memory and later processed to generate composite beam interrupt patterns manifesting the number of persons and direction of movement, the patterns being a function of time domain and sensor index, i.e., sensor identity and position in the passage. The resulting generated patterns are compared to reference patterns utilizing computerized pattern recognition analysis such as with an artificial neural network. The comparison classifies the persons in the passage into direction of movement and number.

20 Claims, 6 Drawing Sheets

APPARATUS FOR CLASSIFYING MOVEMENT OF OBJECTS ALONG A PASSAGE BY TYPE AND DIRECTION EMPLOYING TIME DOMAIN PATTERNS

This application is a continuation of application Ser. No. 08/133,670, filed Oct. 7, 1993 now abandoned.

INTRODUCTION AND BACKGROUND

Apparatus comprising at least one infra-red sensor for detecting people passing through a doorway are known in the art. Normally the apparatus is connected to an alarm to indicate that a person entered or left through the doorway. It will be appreciated that such an apparatus, if connected to a counter, may be utilized to count people passing through the doorway. However, such an arrangement is not adapted to distinguish between people passing in one direction through the doorway and people passing in an opposite direction through the doorway. Furthermore, the known apparatus can also not sense when more than one person pass through the doorway simultaneously or accurately differentiate between people during high flow volumes, so that accurate counting is difficult if not impossible. Neither can such apparatus discriminate between people moving through the doorway and shopping carts, for example, they may happen to be pushing.

OBJECT OF THE INVENTION

Accordingly it is an object of the present invention to provide apparatus and a method with which the applicants believe the aforementioned disadvantages of the known systems may at least be alleviated.

SUMMARY OF THE INVENTION

According to the invention a method of classifying movement of objects along a passage comprises the steps of:

Apparatus for classifying the movement of objects along the length of a passage comprises means for generating a plurality of first object sense signals each manifesting the presence or absence of at least one object moving through a plurality of different spaced regions along the length of the passage, each region corresponding to a different one of the first signals, each first signal having an associated sense index having a value representing its corresponding region, the at least one sensed moving object representing at least one of a plurality of different classes; means for generating from the first sense signals a pattern representation signal representing a multi-dimensional pattern manifesting the at least one object moving in the spaced regions, the pattern comprising a plurality of segments at least one of which segments manifests the movement of the at least one object along the passage, the at least one segment comprising a first dimension in the time domain and a second dimension comprising the sense index value of each said plurality of first signals; and means for classifying the at least one segment of the pattern according to the at least one of the different classes and generating a corresponding output signal.

In one preferred application, events are classified in one of the following classes: (i) one object moving in one direction along the passage; (ii) one object moving in another direction along the passage; (iii) two objects moving together in said one direction; (iv) two objects moving together in said other direction; (v) one object moving in said one direction and another simultaneously in said other direction etc.

Thus, it will be appreciated that the apparatus according to the invention of analyzing movement of objects along a passage may be used to count objects moving in any selected direction along the passage. The objects may be people, so that the number of people moving in a selected direction along the passage may be counted.

Each sensor may have a limited, non-overlapping field of sensitivity and they may be spaced along the length of the passage to cover said plurality of spaced regions.

Means are provided for periodically sampling outputs of said sensors, the output of each sensor having a first or "on" and a second or "off" status Indicating the presence and absence respectively of an object in the field of sensitivity of the sensor.

Means for segmenting the representation may comprise means for simple segmentation wherein the representation is segmented in regions where the outputs of the sensors do not change for longer than a suitably selected limit time period. Alternatively or in addition the means for segmenting the representation may comprise geometrical segmentation wherein geometrical masks with suitable selected shapes are fitted on the representation and wherein the representation is segmented in regions where the masks substantially overlap with regions in the representation representative of absence of objects in said spaced regions along the length of the passage.

The computerized pattern recognition means includes an artificial neural network.

Before a segmented representation is classified by means of the artificial neural network, a feature vector which preferably comprises as elements a combination of moments of inertia of the representation, the eccentricity of the representation and the angle of eccentricity and which describes the representation is extracted from the representation and fed as an input to the artificial neural network.

The sensor outputs are run length encoded before they are stored electronically and decoded again before the geometrical segmentation.

According to another aspect of the invention apparatus for classifying movement of objects along a passage comprises:

object sensor means comprising a plurality of sensors which, in use, are sensitive to the presence or absence of objects in spaced regions along a length of the passage, each sensor being associated with a sensor index;

means connectable to the sensor means for generating electronically a multi-dimensional representation of presence or absence of objects in said spaced regions along the passage, in which representation one dimension is time and another dimension is sensor indices; and computerized pattern recognition means for classifying segments or the representation and for providing an output representative of the classification.

The object sensor means may comprise a first elongate carrier for the sensors, the sensors being spaced in a longitudinal direction along said first, carrier to face transversely said first carrier.

The first carrier may be mounted to extend substantially parallel with a floor in the passage or at an acute angle relative thereto.

In a preferred embodiment four sensors are provided on said first carrier and the spacing between adjacent sensors increases from one end of said first carrier to an opposite end thereof.

In this preferred embodiment the sensors are barrier sensors each comprising a combined source of modulated infra-red light and an infra-red detector mounted on said first carrier and a separate associated reflector mounted on a second elongate carrier, the first and second carriers, in use, being mounted on opposite sides of the passage, so that each combination faces its associated reflector.

In another embodiment the object sensor means may comprise a video camera and the sensors may be a selection of elements in the array of light sensitive elements of the camera.

The means for generating a multi-dimensional representation comprises a sampler connected to the outputs of the sensors, run length encoder means and computing means comprising a processor, an associated memory arrangement end a clock.

The computerized pattern recognition means preferably comprises an artificial neural network trained to provide at an output thereof an indication of the classification performed thereby.

The output of the neural network may be provided to a counter for counting the number of objects that passed in a selected direction along the passage during a defined period of time.

BRIEF DESCRIPTION OF THE ACCOMPANYING DIAGRAMS

The invention will now further be described, by way of example only with reference to the accompanying diagrams wherein.

DESCRIPTION OF A PREFERRED EMBODIMENT OF THE INVENTION

Figure 4:
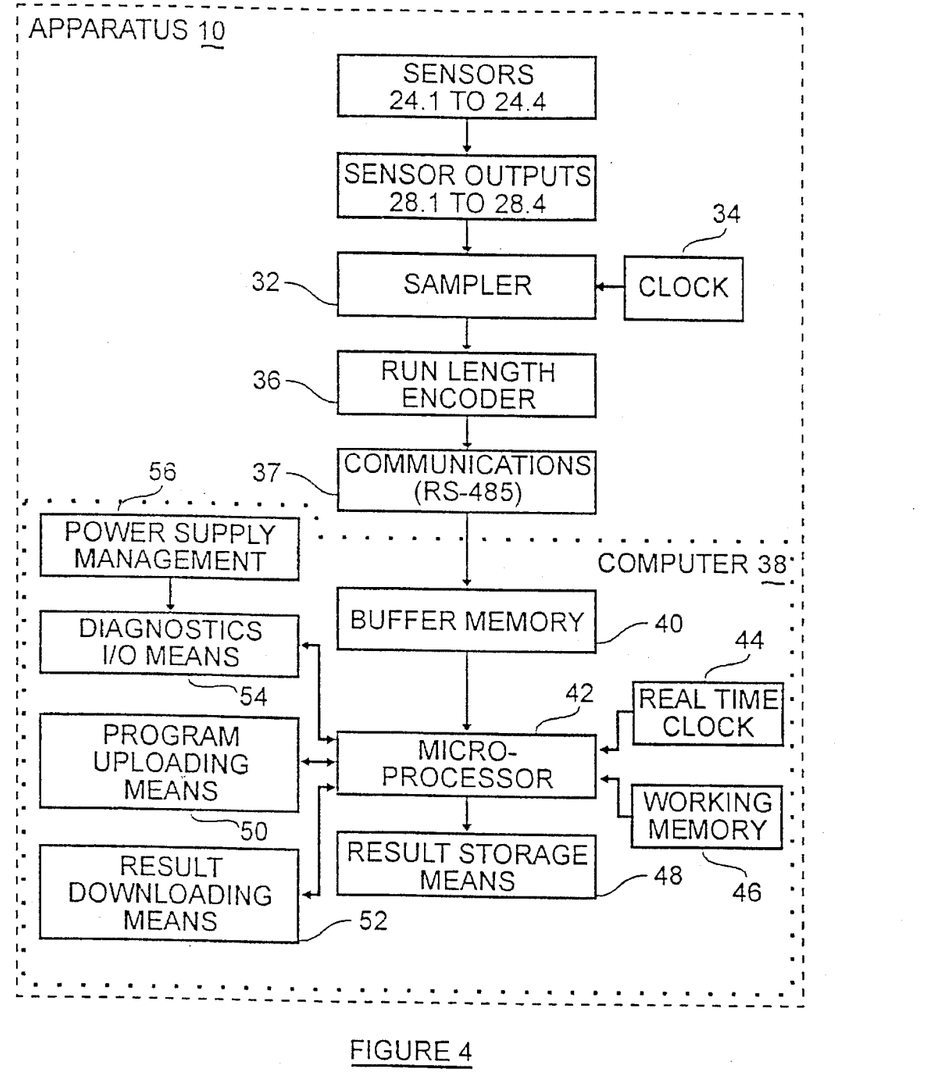
FIG. 4 is a block diagram of the apparatus according to the invention.

One application for the apparatus 10 (shown in FIG. 4 according to the invention is to analyze the movement of objects such as people 11 (shown in FIGS. 1 and 2) along passage 12. The apparatus is trained to distinguish between people that move past the apparatus in different directions, during a defined period of time, even where more than one person moves past the apparatus at the same time. The apparatus may thus form part of a counter for people. The passage 12 is defined by the region between two opposed walls 14 and 16 and a floor 17.

Figure 1:
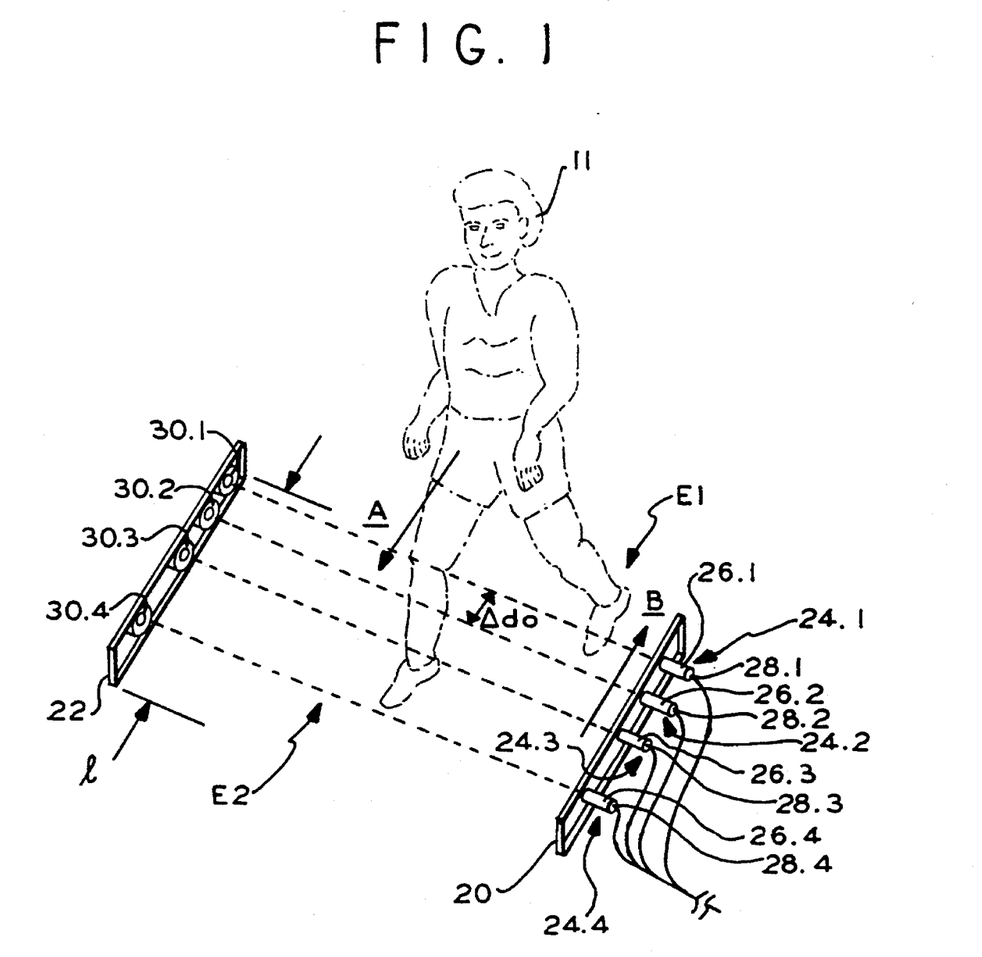
FIG. 1 is a diagrammatic perspective view of sensor means forming part of the apparatus according to the invention.

The apparatus comprises object sensor means 18 comprising two separate elongate carriers 20 and 22 for carrying four so-called barrier sensors 24.1 to 24.4.

Each barrier sensor 24.1 to 24.4 comprises a combined source for modulated infra-red light and an associated detector 26.1 to 26.4. Each source-detector combination 26.1 to 26.4 has an electronic output 28.1 to 28.4 and is mounted on carrier 20 to face in a direction transverse the longitudinal axis of the carrier. Each barrier sensor 24.1 to 24.4 further comprises a separate associated reflector 30.1 to 30.4 mounted on second carrier 22.

As best shown in FIG. 1, the spacing between adjacent sensors increases in direction A. In a preferred embodiment the spacing between sensors is given by the formula:

$$\Delta d_{n+1} = k \Delta d_n$$

wherein $\Delta d_{n+1}$ and $\Delta d_n$ are subsequent spacings between sensors;

$\Delta d_0$ is the spacing between the two sensors closest to one another; and k is a constant>1.

It is believed that this spacing aids the apparatus in distinguishing multiple objects moving in different directions.

Figure 2:
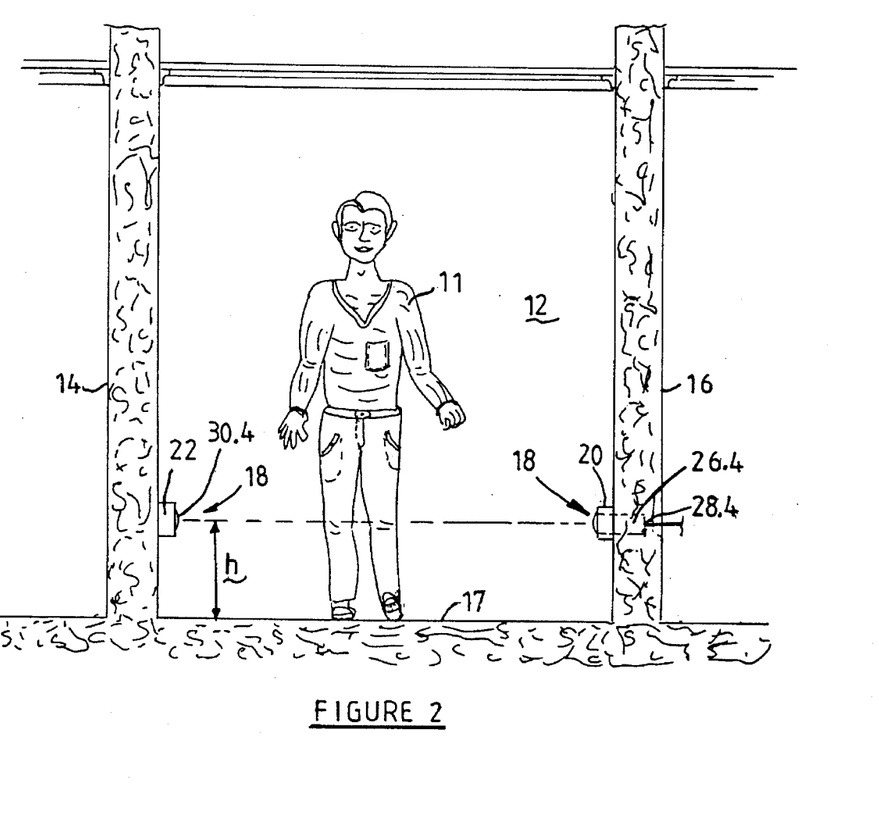
FIG. 2 is a view down a passage wherein the sensor means is mounted.

As best shown In FIG. 2, the carriers 20 and 22 are mounted against opposed walls 14 and 16 to extend substantially horizontally at a height h of between 10 and 40 cm above floor 17, so that each combination 26.1 to 26.4 faces its associated reflector 30.1 to 30.4. With this arrangement the sensors are mounted at substantially knee height in the passage and each sensor is sensitive to the presence or absence of an object within its limited and non-overlapping field of view which is on a line extending transversely the passage.

As shown in FIG. 4, the outputs 28.1 to 28.4 of sensors 24.1 to 24.4 are connected to a sampler 32. Sampler 32 is controlled by a clock 34 intermittently to sample the outputs of the sensors. The output of sampler 32 is connected to a run length encoder 36 the output of which is connected via a suitable serial communications link 37 (RS-232 or RS-485) to a computer 38.

Computer 38 comprises a buffer memory 40 for storing encoded data received from the sensor outputs. The computer 38 further comprises a microprocessor 42, a real time clock 44 and working memory 46 both connected to the microprocessor. Also connected to the microprocessor are a result storage memory 48, program uploading means 50, result downloading means 52 and diagnostics input/output (I/O) means 54. A power supply management arrangement 56 is also provided.

As a mere example, as the person 11 in FIG. 1 walks through the sensor means 18 in direction A, it may happen that his front leg first interrupts the infra-red beam of sensor 24.1, thereafter the beam of sensor 24.2 and thereafter the beam of sensor 24.3, before his rear leg interrupts the first sensor 24.1. When a beam is uninterrupted, as is the case with sensor 24.4, the detector of the sensor 24.4 receives infra-red light reflected from its associated reflector 30.4 and a logical "off" signal is provided at the sensor output 28.4. However, when a beam is interrupted by a leg of the person 11, as is the case with sensor 24.2, no infra-red light is received by the detector and a logical "on" signal is provided at the sensor output 28.1. The logical "on" and "off" signals are referred to herein as the sensor output status.

Figure 3:
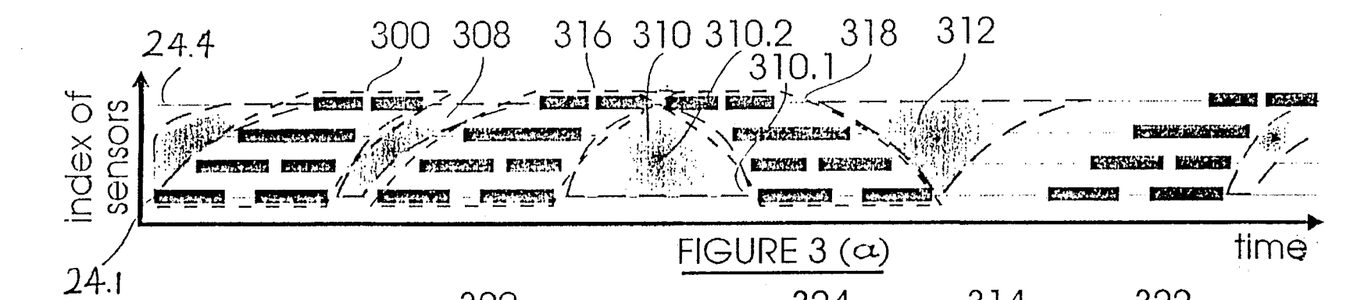
FIG. 3a, FIG. 3b and FIG. 3c are two dimensional representations of sensor output status plotted as a function of sensor index against time.
Figure 5:
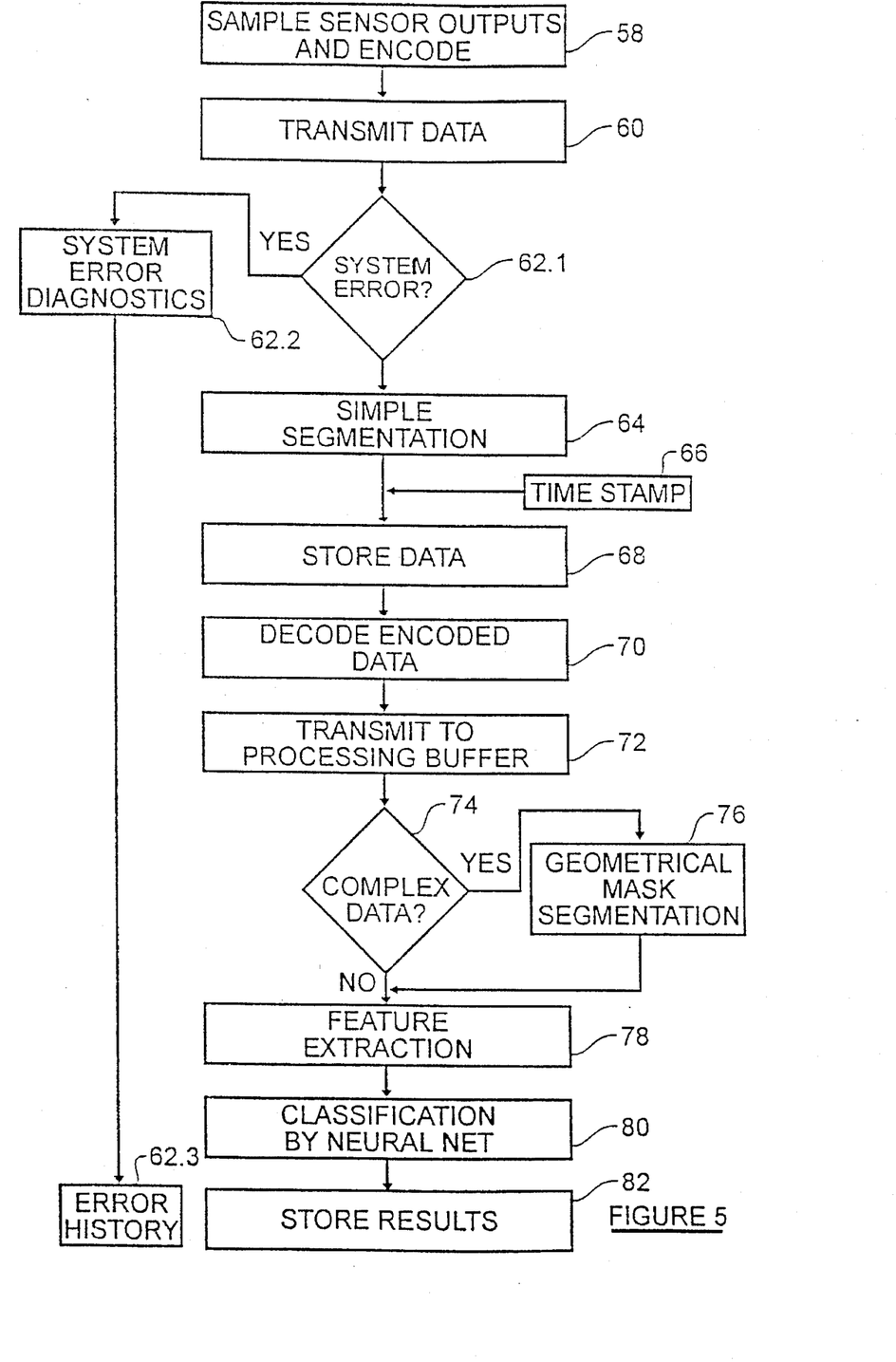
FIG. 5 is a flow diagram of the main processing steps performed by a computer while carrying out the method according to the invention.

Referring now to FIGS. 4 and 5, in use, the sensor outputs 28.1 and 28.4 are sampled by sampler 32 (shown in FIG. 4) and run length encoded at 58 (shown in FIG. 5), As shown at 60, the data is then transmitted to temporary buffer 40 in computer 38 and stored as historic two dimensional representations of sensor output status, wherein one dimension is time and the other is sensor index, i.e, a value representing a particular one of the sensors 24.1–24.4 in the array of sensors along the passage. This value identifies a sensor region along the passage and corresponds to a particular row of darkened segments in FIGS. 3(a)–3(c), for example. Examples of three such historic representations are shown in FIGS. 3(a), 3(b) and 3(c) respectively. A representation of the event described hereinbefore where person 11 moves in direction A past the sensor means 18, is shown at 300 in FIG. 3(a).

Interruption of the beams by a leg moving past the sensors is indicated by the dark rectangles in FIGS. 3(a), 3(b) and 3(c). Strictly speaking each rectangle comprises a train of "on" pixels or picture elements corresponding to the sampling times when the beam is interrupted. The regions between the black rectangles each comprises a train of "off" pixels corresponding to sampling times when the beam was not interrupted.

If a system error is detected, the microprocessor 42 performs diagnostic tests on the system and utilizes the diagnostic I/O arrangement 54 to indicate the current status of the apparatus and to record the results of such tests as indicated at 62.1, 62.2 and 62.3.

As shown at 64 and 66, simple segmentation is applied to the data historic representations and the resulting segments are allocated time stamps with reference to the real time clock 44 shown in FIG. 4.

Simple segmentation to form a pattern comprises searching the historic representation for periods where the sensor outputs remain unchanged for longer than a predetermined period of time and segmenting the representation at such a period. At 302 in FIG. 3(c) there is shown such a period and where event representation 304 may be segmented from event representation 306.

The segmented pattern representation with time stamps are then stored for subsequent processing as shown at 68 in FIG. 5.

When required, the encoded data is retrieved by the microprocessor 42 from the buffer 40 and decoded, as shown at 70 in FIG. 5. As shown at 72 in FIG. 5, these segmented representations are then stored in a processing buffer forming part of working memory 46 (shown in FIG. 4).

If at 74 a segmented representation is found to be complex in that it comprises more than one classifiable event, the next step is the further segmentation of that representation into representations of individual classifiable events.

This further segmentation procedure is referred to as geometrical mask segmentation. A plurality of geometrical masks 308, 310 and 312 (shown in FIG. 3(a)) and 314 (shown in FIG. 3(b)) having shapes determined by the sensor spacing and the nature of the objects expected in passage 12, are overlaid on the previously segmented representations. Thus, in the present application the shapes of the masks are mathematical representations of the expected shapes of regions in the representation where none of the beams are interrupted and which are most likely to occur with one or two people moving to and/or in the passage, either individually or together.

Each geometrical mask is fitted at successive positions on the previously segmented representations and a weighted match value is calculated. This value is weighted according to the position of overlap between mask and "on" pixels, so that "on" pixels overlapped by the edges of the mask 310.1 are less important than "on" pixels in the middle of the mask 310.2. The best matches for each mask type are recorded with the position at which they occur. The best matches are continually compared to a threshold level which In turn is a function of the number of "on" pixels detected since the start of the current geometrical masking procedure. Once a match is found with a value lower than the threshold level, the data Is segmented at that position as shown at 300 and 316 with mask 308.

Once the historic representation has been segmented into representations of classifiable events, such as representations 300, 316 and 318 in FIG. 3(a); 320, 322 and 324 in FIG. 3(b) and 304 and 306 in FIG. 3(c), the next step (shown at 78 in FIG. 5) is the extraction of features from the segmented representations for use in a computerized pattern recognition classification step.

A selection of the following features are contained in a feature vector which numerically describes the representation of the event to be classified:

the moments of inertia of the representation of the event calculated according to the formula herebelow where it is assumed that the origin (x=y=0) is chosen to be at the centre of the representation of the event:

$$M_{ij} = \frac{1}{n} \sum_{x,y} x^i y^j f(x,y)$$

wherein:

n is the total number of "on" pixels in the representation;

x is the time offset into the representation;

y is the sensor index;

f(x,y) is equal to 1 if the pixel at (x,y) is "on" and zero if it is "off"; and i and j are the moment indices;

the eccentricity of the representation of the event, given by the formula:

$$e = \frac{\sqrt{(M_{20} - M_{02})^2 + 4M_{11}^2}}{n}$$

the angle of eccentricity, given by the formula $$\theta = \arctan\left(\frac{2M_{11}}{M_{20} - M_{02}}\right) + \frac{n\pi}{2}$$

The aforementioned calculated feature vector is compared with classes of pre-recorded data. These classes include:

class 0—one person moving in direction A;

class 1—two people moving together in direction A;

class 2—one person moving in direction B;

class 3—two people moving together in direction B;

class 4—one person moving in direction A and another simultaneously in direction B;

class 5—none of the above.

The presently preferred method used to compactly store the pre-recorded data and for comparison of such data with data in the aforementioned calculated feature vector, is to input the feature vector to an artificial neural network with multi-layer perceptron architecture, as shown at 80 in FIG. 5. The neural network is schematically illustrated at 84 In FIG. 6.

Figure 6:
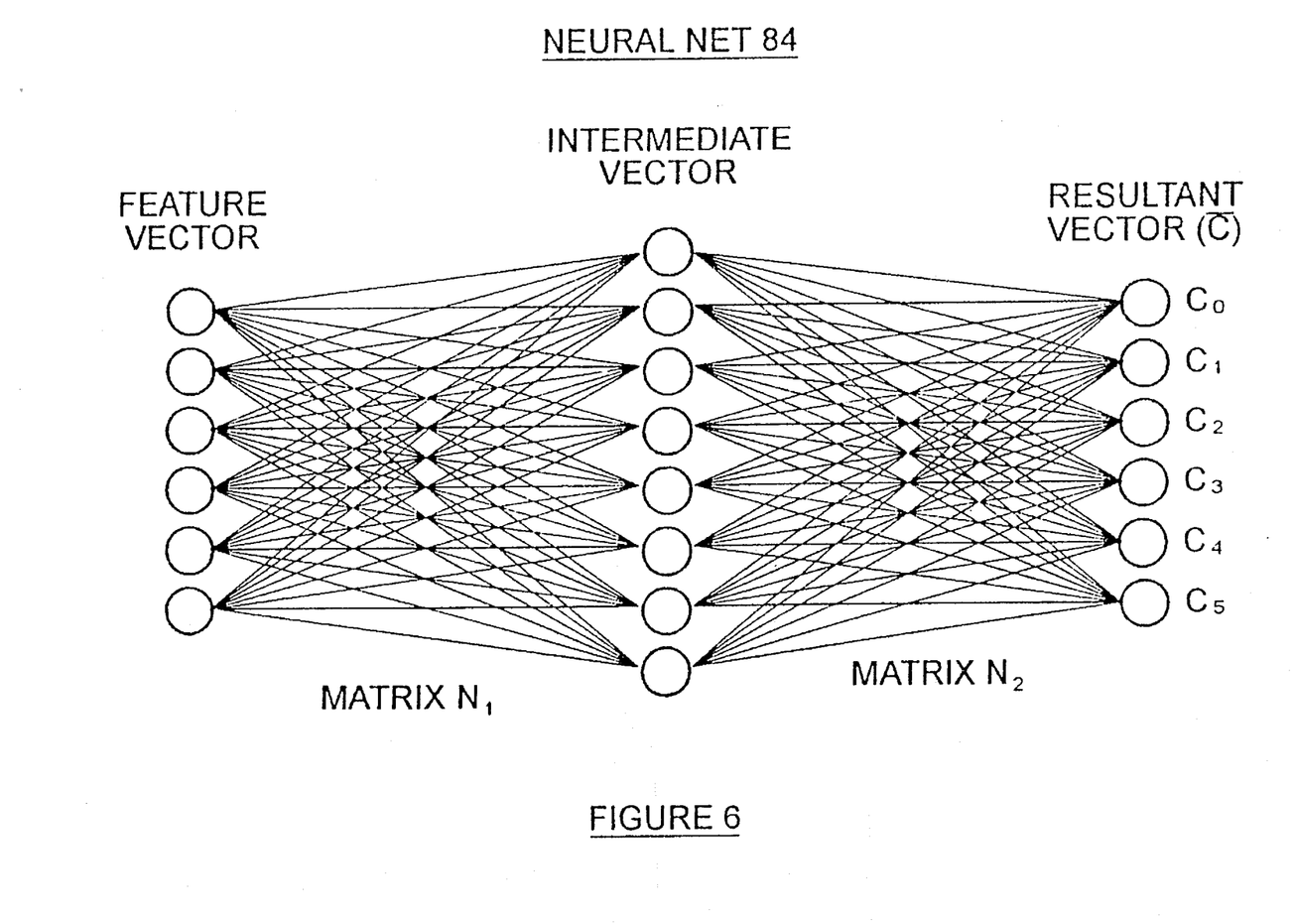
FIG. 6 is a diagrammatic representation of an artificial neural network implemented in a computer forming part of the apparatus.

However, it will be appreciated by those skilled in the art, before the neural network 84 can classify a representation of an event according to the above classes, it must first be trained to do so. This is done by feeding the neural network, by way of the feature vector, data relating to various variations on the events anticipated in use (also referred to as training events) and by training the neural net to indicate the class of each training event in such a way as to minimize the number of false classifications over the whole set of classes. The presently preferred method to train the neural net is based on a method known as back propagation using conjugate-gradient optimization. The result of the training procedure is two interconnecting matrices $N_1$ and $N_2$ for the neural network and which are shown in FIG. 6.

In use, the aforementioned feature vector of a representation of an event to be classified (also referred to as input neurons), is multiplied with the aforementioned first matrix $N_1$ resulting in an intermediate vector (hidden neurons). Each element in the intermediate vector is replaced by its sigmoid and then multiplied by the second matrix $N_2$ to give a resultant vector $\overline{C}$ or output neurons. The index (0 to 5) of the element in the resultant vector $\overline{C}$ having the largest value indicates the index of the class of the event. The relative sizes of the elements in the resultant vector c may also suggest the confidence interval of the classification.

The neural network is thus trained to classify representation 300 as one person moving in direction $\underline{A}$ representation 306 as one person moving in direction $\underline{B}$; representation 320 as two people moving together in direction $\underline{A}$; representation 322 as two people moving together in direction $\underline{B}$; and representation 324 as one person moving in direction $\underline{A}$ and another simultaneously in direction $\underline{B}$.

The result of the classification together with time stamps may be stored in any suitable memory arrangement as shown at 82 in FIG. 5. Such memory arrangements may be any one or more of random access memory, fixed disks or removable disks.

It will be appreciated that the apparatus according to the invention may be implemented in any one of a number of possible configurations. In a first configuration there is provided a centralized (not shown) computer connected to a number of distributed sensor means 18 each with its own sampler 32, encoder and communication interface. Unprocessed data is passed to the central computer for processing. In another configuration, distributed apparatus comprising sensor means 18 and a computer 38 with neural network 84 are connected to a host computer (not shown). In this case, each apparatus processes its own data and downloads the data on request to the host computer where management information is extracted and presented.

It will further be appreciated that the apparatus and method according to the invention is particularly useful for use in a counter or a method of counting objects, especially people, moving in single file or together in either one, the other or both directions along a passage.

It will still further be appreciated that there are many variations in detail on the apparatus and method according to the invention without departing from the scope and spirit of the appended claims.

We claim:

1. Apparatus for classifying the movement of objects along the length of a passage comprising:

means for forming a passage having a length defined by an entrance and an exit spaced from the entrance and through which said objects enter, pass through and leave said passage;

signal generating means coupled to the passage responsive to the presence of said objects in the passage for generating a plurality of first object sense signals each manifesting the presence or absence of at least one of said objects moving through a plurality of different regions spaced along the length of the passage, each region corresponding to a different one of said first signals, each first signal having an associated sense index having a value representing its corresponding region, said at least one sensed moving object representing at least one of a plurality of different classes;

means including signal segmenting means responsive to the first signals applied as an input thereto for generating from said first sense signals a segmented pattern representation signal representing a multi-dimensional pattern manifesting the at least one object moving in the spaced regions, said pattern comprising a plurality of segments at least one of which segments manifests the movement of the at least one object along the passage, said at least one segment comprising a first dimension in the time domain and a second dimension comprising said sense index value of each said plurality of first signals; and means including pattern recognition means for classifying the at least one segment of the pattern according to the at least one of said different classes and for generating a corresponding output signal.

2. Apparatus for classifying movement of objects along a passage comprising:

means for forming said passage having a length defined by an entrance and an exit spaced from the entrance and through which passage said objects pass;

a plurality of object sensors in an array spaced along the passage length, each sensor for generating a corresponding first signal manifesting the presence or absence of at least one object moving in the passage in a corresponding one of a plurality of spaced regions each defined by an object sensor spaced along the length of the passage, each sensor being associated with a corresponding sensor index having a value representing its sensor region, said at least one object moving in the passage representing at least one of a plurality of different classes;

signal generating means including means responsive to the first signals applied as an input thereto for generating a multi-dimensional pattern representation signal whose pattern manifests the presence or absence of the at least one object in the spaced regions, said pattern having a plurality of segments at least one of which manifests the movement of the at least one object along the passage length, said at least one segment comprising a first dimension in the time domain and a second dimension comprising said sensor index value of each of said plurality of first signals; and pattern recognition means responsive to the pattern representation signal applied as an input thereto for classifying the at least one segment of the pattern according to the at least one of said different classes and for generating a corresponding output signal.

3. Apparatus as in claim 2 wherein said signal generating means includes means for storing the generated sense signals as a historic two dimensional representation of the at least one sensed moving object, said signal generating means including means for generating said pattern representation signal from said historic stored representation.

4. Apparatus as claimed in claim 2 wherein the signal generating means includes means for periodically sampling said first signals.

5. Apparatus as claimed in claim 2 wherein the sensors generating the first object sense signals include means for generating a radiation beam in each said regions, said beams in the regions being parallel, said beams being spaced along the passage length according to the relationship:

$$\Delta d_{n+1} = k\Delta d_n$$

where:

$\Delta d_{n+1}$ and $k\Delta d_n$ are subsequent spacings between said beams;

$\Delta d_0$ is the spacing between those two adjacent beams which are closest to one another; and k is a constant.

6. Apparatus as claimed in claim 4 wherein the signal generating means for generating the pattern representation signal includes means for forming each segment from a plurality of corresponding first signals beam portions wherein the values of each sensed beam portion does not change over a time period greater than a selected minimum value.

7. Apparatus as claimed in claim 2 wherein the signal generating means comprises means for geometrically segmenting the pattern employing geometrical masks with selected shaped fitted on the representation pattern for segmenting the representation into segments separated by areas where the masks substantially overlap with those areas in the pattern representation representative of the absence of objects in said spaced regions along the length of the passage.

8. Apparatus as claimed in claim 2 wherein the pattern recognition means includes means for comparing the generated pattern representation signal with a reference pattern employing an artificial neural network.

9. Apparatus as claimed in claim 8 including means for feeding as an input to the artificial neural network before the at least one segment of the pattern representation signal is classified by the artificial neural network a feature vector comprising as elements a combination of moments of inertia of the representation, eccentricity of the representation and angle of eccentricity of the representation and which feature vector describes the pattern representation.

10. Apparatus as claimed in claim 2 wherein the signal generating means includes run length encoding means for encoding the sense signals and means for electronically storing the encoded sense signals.

11. Apparatus as claimed in claim 2 wherein the object sensors comprise a first elongate carrier for the sensors, the sensors being spaced in a longitudinal direction along said first carrier to face transversely said first carrier.

12. Apparatus as claimed in claim 11 wherein four sensors are provided on said first carrier and wherein the spacing between adjacent, sensors increases from one end of said first carrier to an opposite end thereof.

13. Apparatus as claimed in claim 11 wherein the sensors are barrier sensors, each sensor comprising a combined source for infra-red light and an infra-red detector mounted on said first elongate carrier and a separate associated reflector mounted on a second elongate carrier; said first and second carriers in use, being mounted on opposite sides of the passage, so that each combination faces its associated reflector.

14. Apparatus as claimed in claim 2 wherein the means for generating a multi-dimensional pattern representation signal comprises a sampler connected to the outputs of said sensors, run length encoder means for encoding said sampled outputs and computing means comprising a processor including an associated memory arrangement and a clock responsive to said encoded sampled outputs applied thereto.

15. Apparatus as claimed in claim 2 wherein the computerized pattern recognition means comprises an artificial neural network trained to provide at an output thereof an indication of the classification performed thereby.

16. Apparatus as claimed in claim 15 wherein the output of the artificial neural network is provided to a counter for counting the number of objects that passed in a selected direction along the passage during a defined period of time.

17. Apparatus for classifying the movement of objects along the length of a passage comprising:

passage means for forming said passage including an entrance and an exit spaced therefrom defining a passage length;

means coupled to the passage means for generating a plurality of first object sense signals across said passage at spaced intervals along the passage length, each signal manifesting the presence or absence of at least one object moving through a plurality of different spaced regions along the length of the passage, each region corresponding to a different one of said first signals, each first signal having an associated sense index having a value representing its corresponding region, said at least one sensed object representing at least one of a plurality of different classes comprising the movement of the at least one object in either of two opposite directions along the passage;

pattern generating means responsive to the sense signals applied thereto for generating from said first sense signals a pattern representation signal representing a multi-dimensional pattern manifesting the at least one object moving in the spaced regions along the passage length, said pattern of the representation signal comprising a plurality of segments at least one of which segments manifests the movement of the at least one object along the passage, said at least one segment comprising a first dimension in the time domain and a second dimension comprising said sense index value of each of said first signals; and pattern recognition means for classifying the at least one segment of the pattern according to the at least one of said different classes and for generating a corresponding output signal.

18. Apparatus for classifying movement of objects along a passage comprising:

means for forming a passage having a length defined by an entrance spaced from an exit through which said object passes;

a plurality of object sensors in an array spaced along the passage length, each sensor for generating a corresponding first signal manifesting the presence or absence of at least one object moving in the passage in a corresponding one of a plurality of spaced regions along the length of the passage, each sensor being associated with a corresponding sensor index having a value representing its corresponding region, said at least one object when moving in the passage representing at least one of a plurality of different classes comprising movement of the at least one object is either of two opposite directions along the passage;

signal generating means including means responsive to the first signals applied as an input thereto for generating a multi-dimensional pattern representation signal whose pattern manifests the presence or absence of the at least one object in the spaced regions, said pattern having a plurality of segments at least one of which manifests the movement of the at least one object along the passage, said at least one segment comprising a first dimension in the time domain and a second dimension comprising said sensor index value of each said first signals; and pattern recognition means responsive to the pattern representation signal applied as an input thereto for classifying the at least one segment of the pattern according to the at least one of said different classes and for generating a corresponding output signal.

19. The apparatus of any one of claims 2 and 18 including means for storing the generated sense signals as a historic two dimensional representation of the at least one sensed moving object, said signal generating means for generating the pattern representation signal including means for generating said pattern representation signal from said stored historic two dimensional representation sense signals.

20. The apparatus of claim 17 wherein the signal generating means includes means for storing the generated sense signals as a historic two dimensional representation of the at least one sensed moving object, said means for generating the pattern representation signal including means for segmenting said pattern representation signal from said historic stored sense signals.

* * * * *